United States Patent
Sekharan

(10) Patent No.: US 9,582,554 B2
(45) Date of Patent: Feb. 28, 2017

(54) BUILDING INTELLIGENT DATASETS THAT LEVERAGE LARGE-SCALE OPEN DATABASES

(71) Applicant: Satishkumar Sekharan, Vancouver (CA)

(72) Inventor: Satishkumar Sekharan, Vancouver (CA)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 746 days.

(21) Appl. No.: 14/075,675

(22) Filed: Nov. 8, 2013

(65) Prior Publication Data
US 2015/0134685 A1    May 14, 2015

(51) Int. Cl.
*G06F 17/30*    (2006.01)

(52) U.S. Cl.
CPC .... *G06F 17/30557* (2013.01); *G06F 17/3089* (2013.01)

(58) Field of Classification Search
CPC .................................................. G06F 17/3089
See application file for complete search history.

(56) References Cited

U.S. PATENT DOCUMENTS

| | | | | |
|---|---|---|---|---|
| 7,325,188 B1* | 1/2008 | Covington | .......... | G06F 17/3089 707/E17.116 |
| 7,614,057 B2* | 11/2009 | Whittenberger | .. | G06F 17/30569 709/205 |
| 2010/0198823 A1* | 8/2010 | Tsoukalas | ............. | G06F 17/241 707/736 |
| 2012/0011115 A1* | 1/2012 | Madhavan | ........ | G06F 17/30864 707/723 |
| 2013/0097522 A1* | 4/2013 | Devries | ............. | G06F 17/30905 715/745 |
| 2014/0028683 A1* | 1/2014 | Luo | ........................ | G06T 11/206 345/440.2 |
| 2015/0106376 A1* | 4/2015 | Gattiker | ............. | G06F 17/3066 707/738 |

* cited by examiner

*Primary Examiner* — Kris Mackes
(74) *Attorney, Agent, or Firm* — Fountainhead Law Group P.C.

(57) ABSTRACT

Techniques are described for importing data from a web page and enriching the imported data. While presenting a web page on a web browser, an input can be received to select an area of the web page. Tables that correspond to the selected area can be imported into a dataset as plain text. Tables imported in this manner can be verified and subsequently enriched. Data enrichment can include providing context to an entry. Data enrichment can also include associating or importing related data into the table from an open access database.

20 Claims, 12 Drawing Sheets

|   | 310 | 320 | |
|---|---|---|---|
| City | Providence | Population | Average_Percentage |
| Surrey | BC | 444583 | 58.2 |
| New Westminster | BC | 66311 | 43.4 |
|  | BC | 660,496 | 33.5 |
|  | BC | 105,708 | 30.5 |
| Maple Ridge | BC | 77202 | 24.5 |
| Burnaby | BC | 230009 | 20.7 |
| North Vancouver | BC | 51175 |  |
| Richmond | BC | 196856 |  |
| Port Coquitlam | BC | 59039 | -10.9 |
| Coquitlam | BC | 128747 | -11.8 |
| Delta | BC | 109322 | -18.7 |
| West Vancouver | BC | 50269 | -38.3 |

FIG. 3a

| City | Providence | Population | Average_Percentage |
|---|---|---|---|
| Surrey | BC | 444583 | 58.2 |
| New Westminster | BC | 66311 | 43.4 |
| | BC | 660,496 | 33.5 |
| | BC | 105,708 | 30.5 |
| Maple Ridge | BC | 77202 | 24.5 |
| Burnaby | BC | 230009 | 20.7 |
| North Vancouver | BC | 51175 | |
| Richmond | BC | 196856 | -10.9 |
| Port Coquitlam | BC | 59039 | -11.8 |
| Coquitlam | BC | 128747 | -18.7 |
| Delta | BC | 109322 | |
| West Vancouver | BC | 50269 | -38.3 |

FIG. 3b

| City | Providence | Population | Average_Percentage |
|---|---|---|---|
| Surrey | BC | 444583 | 58.2 |
| New Westminster | BC | 66311 | 43.4 |
| Maple Ridge | BC | 77202 | 24.5 |
| Burnaby | BC | 230009 | 20.7 |
| North Vancouver | BC | 51175 | |
| Richmond | BC | 196856 | |
| Port Coquitlam | BC | 59039 | -10.9 |
| Coquitlam | BC | 128747 | -11.8 |
| Delta | BC | 109322 | -18.7 |
| West Vancouver | BC | 50269 | -38.3 |

FIG. 3c

| City | Providence | Population | Average_Percentage |
|---|---|---|---|
| Surrey | BC | 444583 | 58.2 |
| New Westminster | BC | 66311 | 43.4 |
| Maple Ridge | BC | 77202 | 24.5 |
| Burnaby | BC | 230009 | 20.7 |
| North Vancouver | BC | 51175 | |
| Richmond | BC | 196856 | -10.9 |
| Port Coquitlam | BC | 59039 | -11.8 |
| Coquitlam | BC | 128747 | |
| Delta | BC | 109322 | -18.7 |
| West Vancouver | BC | 50269 | -38.3 |

FIG. 3d

BUILDING INTELLIGENT DATASETS THAT LEVERAGE LARGE-SCALE OPEN DATABASES

BACKGROUND

Information and media sharing has been redefined with the advent of the Internet. The World Wide Web contains billions of web pages that contain information. By routing through a portion of the Internet, the information in each web page can be consumed by the user. Recently, public collections of information such as online encyclopedias and directories have also surfaced. These public collections of information, also known as large-scale open access databases, are used as reference material by thousands of users every day. The reference material can be used in creating presentations or Interactive Infographics on a desired topic.

With the plethora of information available on the Internet, it has become time-consuming to locate relevant information. Information is added to the Internet every day and as a result, the time and effort required to search through the information is exponentially increasing. Moreover, relevant information that is found needs to be processed before it can be incorporated into an existing presentation or Interactive Infographic. This process can be complex and time-consuming.

SUMMARY

In one embodiment, a computer-implemented method receives, by a processor, a table containing a plurality of entries, each entry storing plain text. The method then continues with receiving, by the processor, an entity database containing an entity collection, the entity collection including a plurality of entity tags that belong to a category, wherein an entity tag from the plurality of entity tags is linked with information from an open access database. Upon receiving the entity database, the method then determines, by the processor, that a set of entries from the plurality of entries belong to the category. The method then matches an entry in the set of entries to the entity tag and links the entity tag to the entry.

In one example, the method further includes enriching the table with information from the open access database according to the entity tag. Enriching can include importing information from the open access database to the table based on the entity tag.

In another example, determining that the set of entries belong to the category includes matching, by the processor, a subset of the set of entries with one of the plurality of entity tags. The plurality of entity tags can include a text field and matching the subset of the set of entries includes comparing, by the processor, the plain text for each of the subset of entries with the text field of the plurality of entity tags.

In another example, receiving the table includes detecting, by the processor, an input representative of selecting an area of a web page, determining, by the processor, that the area of the web page substantially contains the table, and scraping, by the processor, the table from the web page.

In another embodiment, a non-transitory computer readable storage medium stores one or more programs comprising instructions for receiving a table containing a plurality of entries, each entry storing plain text. The one or more programs further include instructions for receiving an entity database containing an entity collection, the entity collection including a plurality of entity tags that belong to a category, wherein an entity tag from the plurality of entity tags is linked with information from an open access database. The one or more programs further include instructions for determining that a set of entries from the plurality of entries belong to the category. The one or more programs further include instructions for matching an entry in the set of entries to the entity tag. The one or more programs further include instructions for linking the entity tag to the entry.

In another embodiment, a computer implemented system comprises one or more computer processors and a non-transitory computer-readable storage medium. The non-transitory computer-readable storage medium comprises instructions, that when executed, control the one or more computer processors to be configured for receiving a table containing a plurality of entries, each entry storing plain text, receiving an entity database containing an entity collection, the entity collection including a plurality of entity tags that belong to a category, wherein an entity tag from the plurality of entity tags is linked with information from an open access database, determining that a set of entries from the plurality of entries belong to the category, matching an entry in the set of entries to the entity tag, and linking the entity tag to the entry.

The following detailed description and accompanying drawings provide a better understanding of the nature and advantages of the present disclosure.

BRIEF DESCRIPTION OF THE DRAWINGS

FIG. 3a illustrates a screenshot of an application running on the client according to one embodiment;

FIG. 3b illustrates a screenshot of an application running on the client according to one embodiment;

FIG. 3c illustrates a screenshot of an application running on the client according to one embodiment;

FIG. 3d illustrates a screenshot of an application running on the client according to one embodiment;

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
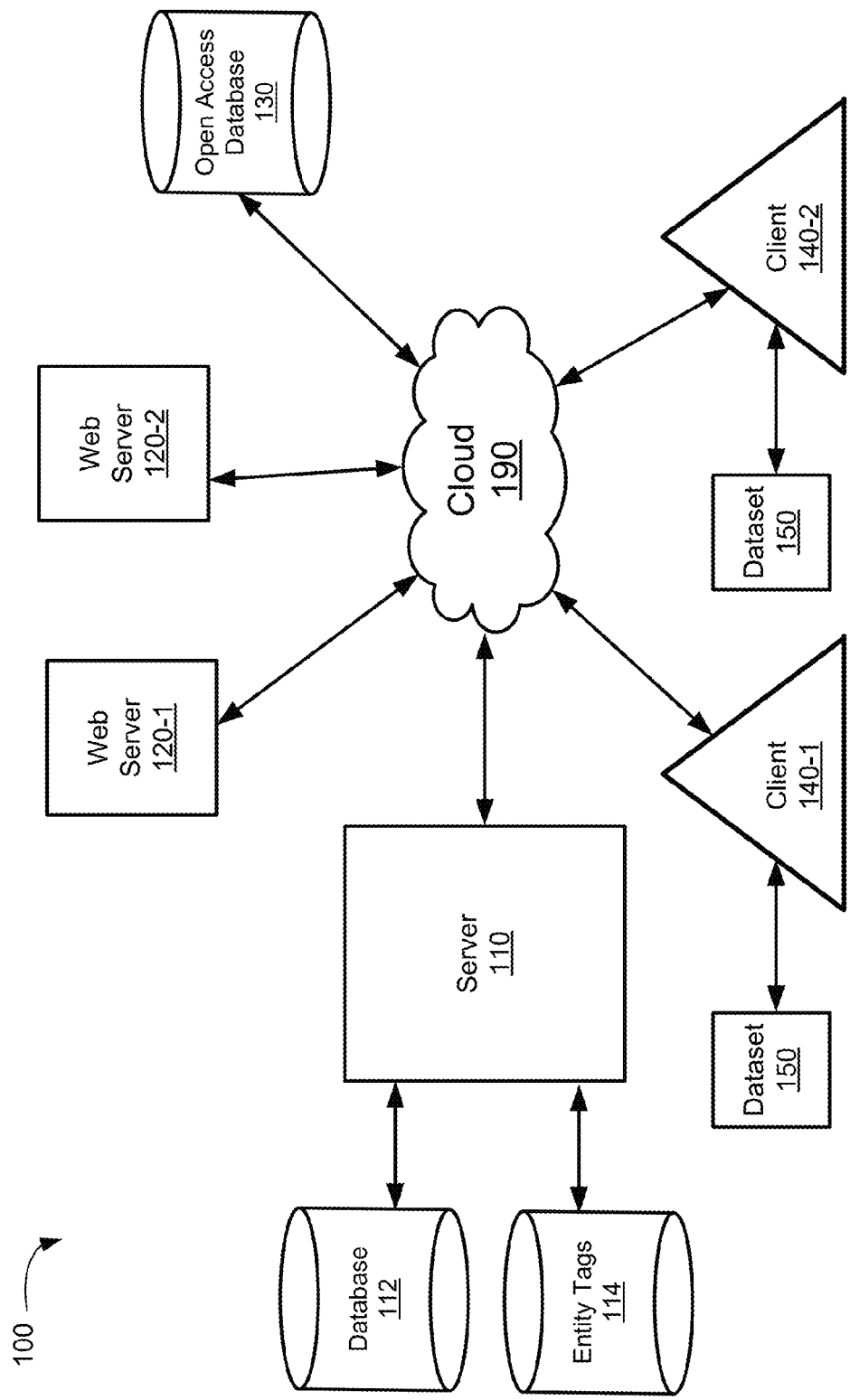
FIG. 1 illustrates a system according to one embodiment.

FIG. 1 illustrates a system according to one embodiment. System 100 includes server 110, web server 120-1, web server 120-2, open access database 130, client 140-1, and client 140-2. Each of these devices can be connected to one another through cloud 190. Client 140-1 can communicate with server 110, web servers 120, and open databases 130 to create dataset 150. A dataset is a collection of data that is related to a topic, object, or event. For example, a dataset can include data related to the quality of schools in a given area or data related to the severity of crime in a given area. In some examples, the dataset can be a table.

Client 140-1 can collect data for dataset 150 from a variety of sources. The data can be collected and processed by an application running on client 140-1. In one embodiment, client 140-1 can collect data for dataset 150 from web server 120-1. This can include client 140-1 scraping or selectively copying data from a web page received from web server 120-1. Once collected, web server 120-1 can populate dataset 150 using the collected data. In another embodiment, client 140-1 can collect data from database 112 of server 110. This can include transmitting a request to server 110 for data from database 112 and receiving the requested data from server 110. In some examples, the data scraped/copied/collected from web server 120 or server 110 can be plain text. Plain text is characters and numbers without metadata. As a result, plain text does not contain context. For instance, the word "apple" as plain text can mean either the fruit or the technology company. It is not until context is provided that the intended meaning can be determined.

In one embodiment, server 110 can be configured to verify dataset 150. Server 110 can receive dataset 150 from client 140-1 and validate the content in dataset 150. Content validation can include verifying that a table in dataset 150 is properly generated without entries that are missing or entries that contain illegal values. Once dataset 150 has been validated, server 110 can transmit dataset 150 back to client 140-1. The transmission of dataset 150 to server 110 can be managed by an application running on client 140-1. In yet other embodiments, the content validation algorithms can be stored on client 140-1, thus allowing content validation to be performed by client 140-1.

In another embodiment, server 110 can be configured to maintain a master copy of dataset 150 on database 112. When changes are made to dataset 150 by client 140-1, the changes can be transmitted from client 140-1 to server 110. Server 110 in turn updates the master copy of dataset 150 stored in database 112 accordingly. By maintaining a master copy of dataset 150 in database 112, multiple clients can work on dataset 150 simultaneously. Each client can work on a copy of dataset 150 and any changes made to dataset 150 can be collected by server 110 to update a master copy of dataset 150. Whenever the master copy is updated, the changes are propagated down to the clients. For example, client 140-2 can work on a copy of dataset 150 while client 140-1 can work on another copy of dataset 150. Client 140-2 can change dataset 150 by using data collected from web server 120-2. At some point in time, changes to dataset 150 made by both clients 140-1 and 140-2 can be transmitted to server 110 where the changes are used to update the master copy of dataset 150. Server 110 can also resolve any conflicts that are related to two clients who change the same entry of dataset 150. This is known as conflict resolution. Once server 110 has updated the master copy of dataset 150, the master copy or changes to the master copy can be propagated to client 140-1 and 140-2 so that they both are working off of the same master copy of dataset 150. In one example, different copies of dataset 150 can be managed using version control such as a version number for dataset 150. In one embodiment, server 110 can verify dataset 150 as it updates dataset 150.

In another embodiment, server 110 can be configured to enrich dataset 150. Data enrichment can include providing context to data stored in dataset 150. For example, dataset 150 can include the word "Apple" in an entry. The word "Apple" can have many meanings, including the fruit and the technology company. Without context, it is difficult to determine the meaning of the entry. Server 110 can enrich dataset 150 by assigning one or more entity tags to an entry, column, or row of dataset 150. Assigning an entity tag can include linking the entity tag or even replacing the plain text in an entry with the entity tag. The entity tag can provide context to data stored in entry, column, or row. In one example, server 110 can analyze dataset 150 before assigning an entity tag. For instance, server 110 can analyze neighboring columns or entries in a column before assigning an entity tag to the column. The entity tags can be arranged as entity collections in entity tags database 114. Server 110 can enrich dataset 150 by comparing and matching entries in dataset 150 with entity tags in an entity collection of entity tags database 114.

In some embodiments, the context provided by an entity tag can allow client 140 or server 110 to further enrich dataset 150 with information from database 112 or open access database 130. Open access database 130 is a reference site containing a collection of references that are publicly accessible. Each reference can be an article, a paper, a table, a chart, a figure, or other information. In some examples, each reference can be associated with one or more entity tags that are used to classify the reference. In some examples, references in open access database 130 can be grouped or linked together according to their entity tags. In other examples, open access database 130 can be a community-built database containing references that are generated by members of the community.

Data in database 112 or open access database 130 that is associated with an entity tag can be used to enrich data in database 150 that has the same entity tag. For example, open access database 130 can have a first article on the fruit "apple" and a second article on the technology company "Apple®." The first article can be associated with a fruit entity tag while the second article can be associated with a technology entity tag. Client 140-1 or server 110 can analyze dataset 150 and determine that a column having a fruit entity tag includes an entry containing the word "apple." In response to the word and the entity tag, column 140-1 or server 110 can enrich the entry by associating the entry with the first article from open access database 130. Server 110 can access entity tags 114 to determine the entity tags that are known and to determine the reference objects or database objects in database 112 or open access database 130 that are associated with a given entity tag. In other examples, the data in database 112 or open access database 130 can be imported into dataset 130 as part of dataset enrichment.

Figure 2A:
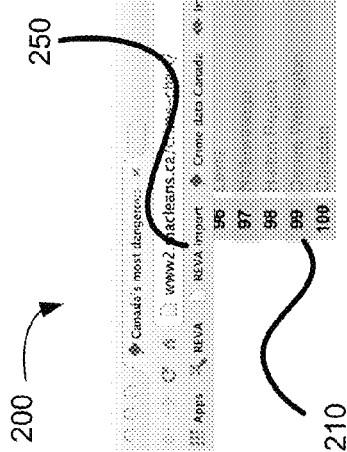
FIG. 2a illustrates a web browser presenting a web page according to one embodiment.

FIG. 2a illustrates a web browser presenting a web page according to one embodiment. Client 140 includes a web browser application that receives data from web server 120 to generate web page 200. Web page 200 includes table 210, table 220, and bookmark link 250. Bookmark link 250 can be configured to trigger an applet of the web browser. When bookmark link 250 is selected, the applet can be executed to collect data from web page 200. The collected data can be imported into an application running on client 140. The application can process the imported data and use the data for creation for an infographic. In some embodiments, the data collected can include data presented on web page 200 and other metadata such as the address of the web page, the address of images collected, the time that the data was collected, the name of documents collected, etc. The metadata can be later utilized by the application to provide context to the data collected. In some embodiments, the applet can be provided from server 110 and installed in the web browser as a plug in.

Figure 2B:
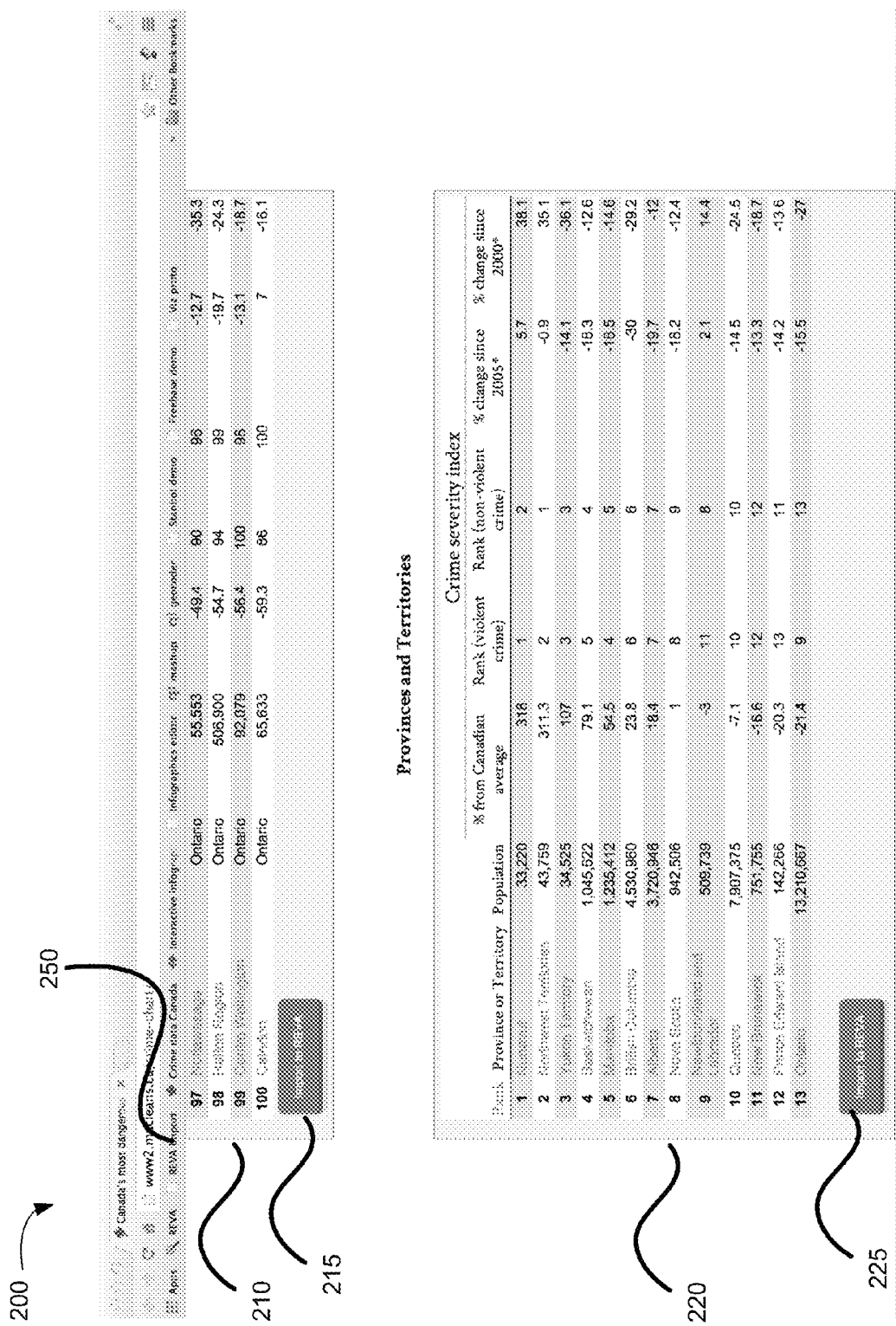
FIG. 2b illustrates a web browser running an applet on a web page according to one embodiment.

FIG. 2*b* illustrates a web browser running an applet on a web page according to one embodiment. The applet is configured to search web page 200 for objects of a predefined type. The predefined type can be tables, graphs, charts, images, embedded documents, pdfs, a combination of these, or others. In some embodiments, the applet is also configured to generate a selectable link on web page 200 for each object that is found. When the applet detects that a selectable link has been selected, the applet can collect the respective object from web server 120. The collected object can be used to generate the dataset. Here, the applet searches web page 200 for tables. A search for tables can be performed by using a standard query for all tables within the web page. The search returns tables 210 and 220. As a result, the applet generates selectable link 215 that is associated with table 210 and selectable link 225 that is associated with table 220. In one example, the applet can modify the HTML code received from web server 120 to include selectable links 215 and 225 before rendering the HTML code as web page 200. In another example, the applet can generate a HTML canvas over web page 200 where the HTML canvas includes selectable links 215 and 225. The HTML canvas can overlay web page 200 and therefore be presented at the same time as web page 200.

Figure 2C:
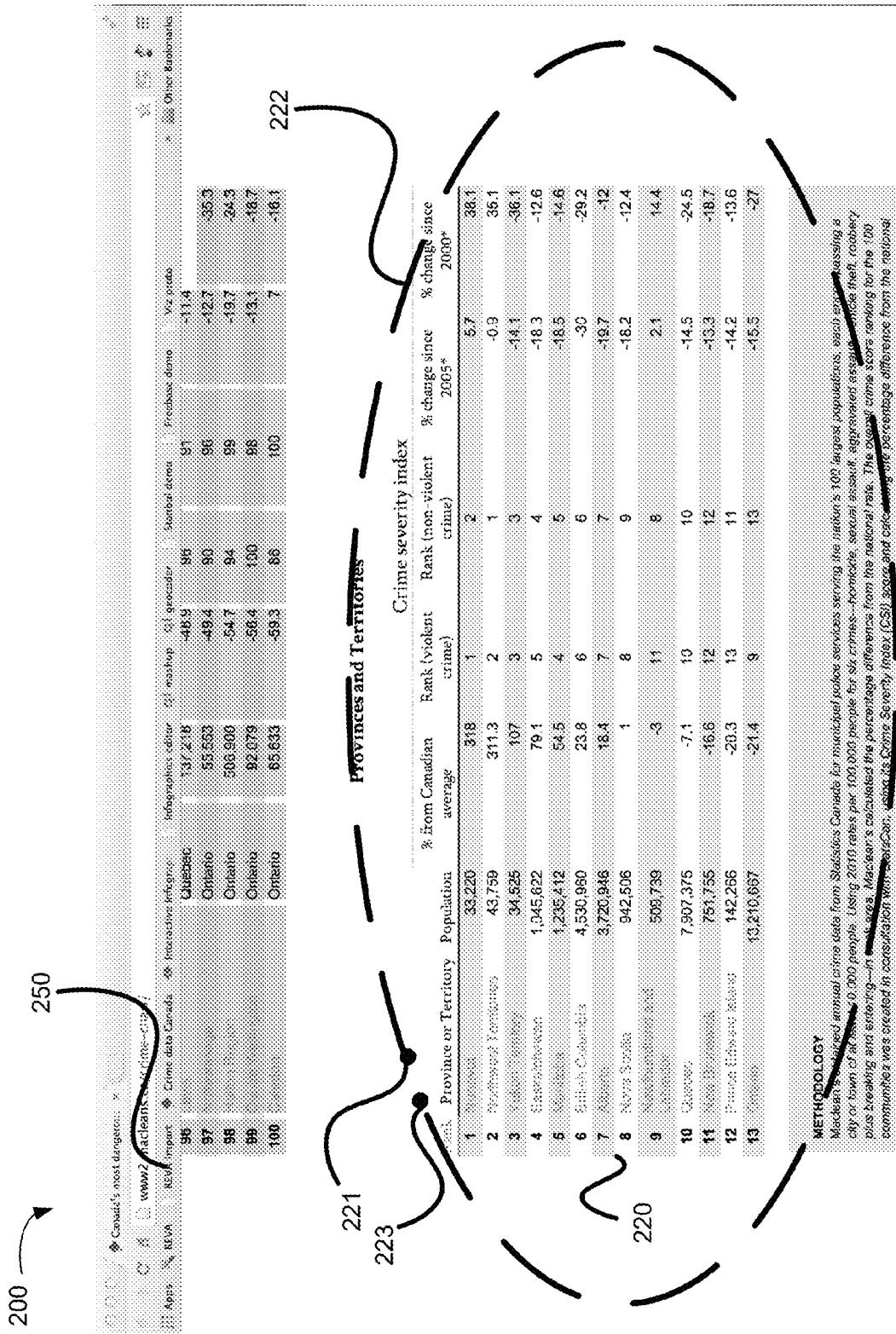
FIG. 2c illustrates a web browser running an applet on a web page according to another embodiment.

FIG. 2*c* illustrates a web browser running an applet on a web page according to another embodiment. Here, the applet can take a more user-centric approach to collecting data by allowing a user to draw a line around one or more objects in the web page that the user would like to include in a dataset. In one embodiment, the applet can generate an HTML canvas on top of web page 200. The HTML canvas is a clear layer that allows for dynamic rendering of shapes. The rendered shapes exist on the HTML canvas and can overlay web page 200. The rendering of shapes can be based on a variety of user input, including mouse, touchpad, and a touch sensitive display.

Here, the applet can detect a touch gesture on a touch display presenting web page 200 of a finger touching point 221 and drawing line 222. At point 223, the applet can detect the finger being lifted from the touch display. These touch gestures can be interpreted by the applet to draw line 222 on the HTML canvas. The line drawn allows a user to visualize the shape that has been drawn using the touch gestures. If the start point and end point of the line drawn connects, the applet forms a shape based on the line drawn. In some examples, the applet can still form a shape even when the start point and the end point touch do not touch each other so long as the applet detects that the start point and end point are substantially close to one another. Once the shape has been drawn, the applet can query web page 200 for objects that are within or substantially within the shape. The query can examine the shape against the location of objects in web page 200 to identify objects that are within or substantially within the shape. For objects that are partially within the shape, a determination can be made as to whether the majority of the object is within the shape. Here, table 220 is located within the shape created by line 222 drawn on HTML canvas. As a result, the applet collects table 220 for later use.

In yet another embodiment, the applet can detect two points that are simultaneously touching a touch sensitive display. The two points can be detected as the boundaries of a quadrilateral. In one example, the first point can be interpreted as the top left corner and the second point can be interpreted as the bottom right corner. In another example, the first point can be interpreted as the bottom left corner and the second point can be interpreted as the top right corner. Upon detecting the boundaries of the quadrilateral, the applet can search web page 200 for objects that are located within the quadrilateral.

In some embodiments, the applet can perform different actions depending on the type of object that is located. For example, images can be saved in a cache such as a shelf for easy incorporation into an infographic. As another example, images containing text can be processed by an optical character recognition program. As another example, tables can be imported by creating a table and migrating the values from the table to the newly created table. In yet other embodiments, the applet can perform different actions depending on the state of another application running on client 140. For example FIGS. 3*a* to 3*d* illustrate techniques for verifying collected data. Data collected may need to be verified to correct for errors generated during the collection process. For example, text and numbers in tables may have been improperly recognized by a text recognition program when the data is collected. As another example, tables having an uncommon structure may not be properly preserved. Uncommon structures can be a table that includes a column having two entries in a first row and only one entry in a second row. These irregular table structures can be improperly scanned, resulting in the values of the dataset not lining up properly in the collected table.

FIG. 3*a* illustrates a screenshot of an application running on the client according to one embodiment. Screenshot 300 includes an application graphical user interface (GUI) that is displaying dataset 150. Dataset 150 is displayed as table 320 and the values within table 320 have been verified by the application with the results of the verification process being presented in status bar 310. Status bar 310 is presented above the columns of table 320 to identify the status of each column. In one embodiment, the status of each column can be visually represented with the use of flags. If no flags are present in the portion of status bar 310 above a column, then that column has passed verification. Alternatively if a flag is present in the portion of status bar above the column, then that column has verification issues. Depending on the issue, a different flag can be presented. Here, flag 311 is one type of flag for identifying missing entries while flags 312 and 313 are another type of flag for identifying improper values in entries.

FIG. 3*b* illustrates a screenshot of an application running on the client according to one embodiment. Screenshot 300 is a continuation from FIG. 3*a*. Above table 320 is status bar 310 that summaries problems identified during the verification process. In one embodiment, selecting a flag in status bar 310 can trigger an action to correct the problem with the associated column of table 320. Here, the application draws box 360 around the rows of table 320 with the problem of an entry missing a value. The application also provides suggestions 350 for actions that can be performed to correct the problem. A user can select one of the suggestions provided and the problem can be corrected accordingly. The suggestions presented can be ordered according to the suggestions that most likely will resolve the problem. In one example, a suggestion for a missing entry can be to delete the row in which that empty entry is located. In another example, a suggestion for a missing entry can be to fill in the missing entry with the value from a neighboring entry in the same column Here, the user selects an action to delete the rows that contain an empty entry in the selected column.

FIG. 3c illustrates a screenshot of an application running on the client according to one embodiment. Screenshot 300 is a continuation from FIG. 3b. After removing the rows of table 320 that contain an empty entry, verification is preformed again on table 320. By removing the two rows, the problem associated with flag 312 of FIG. 3b has also been corrected since the issue was with the same rows of entries. Thus, the only remaining problem is with the column associated with flag 313.

FIG. 3d illustrates a screenshot of an application running on the client according to one embodiment. Screenshot 300 is a continuation from FIG. 3c when flag 313 is selected. Upon selection of flag 313, the application can draw box 380 around the rows of table 320 that contain improper values in the selected column. Here, both rows contain an entry that is improper for the column "Average_Percentage" because the entry does not contain a number. Suggestions 370 can also be provided as actions that can be performed to correct the problem.

Figure 4A:
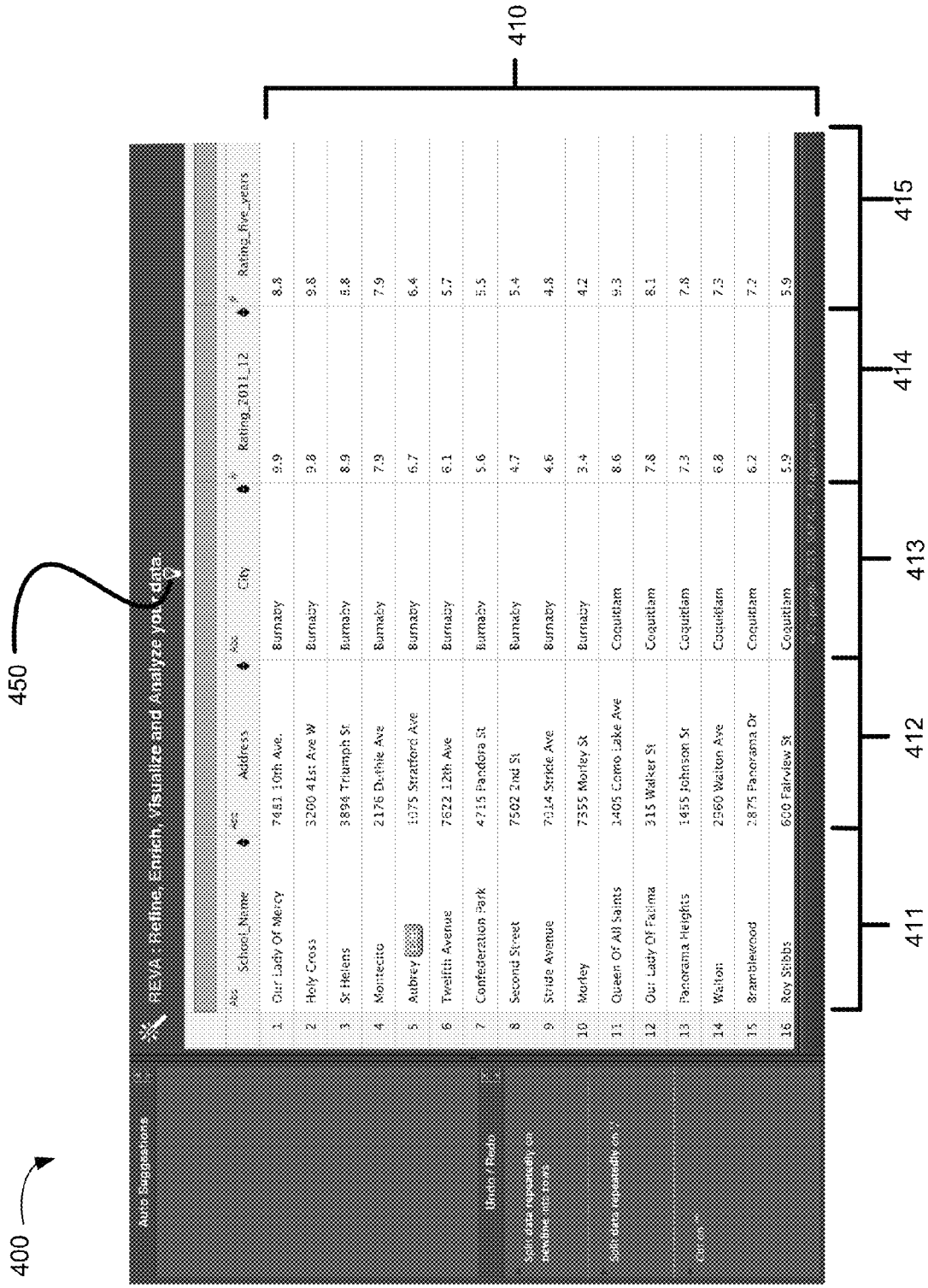
FIG. 4a illustrates a screenshot of an application enriching data according to one embodiment.
Figure 4B:
FIG. 4b illustrates a screenshot of an application enriching data according to one embodiment.

FIGS. 4a and 4b illustrate a screenshot of an application enriching data according to one embodiment. The application can evaluate data within dataset 150 and provide context to the data based on the evaluation. Providing context to the data can be beneficial since the meaning of the data can be determined This can allow the application to automatically search for and provide additional information to further enrich the data. For example, the application can provide additional information from open databases 130 to enrich dataset 150.

FIG. 4a illustrates a screenshot of an application enriching data according to one embodiment. Screenshot 400 includes table 410. The application can analyze table 410 to determine whether the context of data in table 410 can be determined. The analysis can include comparing data in table 410 against a database of entity tags stored on client 140 or server 110. The database of entity tags can be organized into entity collections where each entity collection belongs to a category. In one example, the application can evaluate the entries in a row or column of table 410 for commonalities to determine whether all the entries in the row or column belong to the same category. The evaluation can include determining that all entries in a column belonging to a category. Examples of categories include cars, names of drugs, and cities. For instance, the application can evaluate table 410 to determine that all the entries in column 412 are addresses (e.g., all end in "Ave," "St," or "Dr") and that all the entries in column 413 are cities (e.g., all entries are city names in a city name database).

In another example, the header of each row or column can be evaluated to determine the type of data stored in the row or column In yet another example, metadata collected along with the data can be evaluated to provide context to the data. For instance, the web address where the data was collected, the time of day in which the data was collected, the web server's stored metadata that is associated with the data (e.g., name of object on the web server, description of object on the web server, filename on the web server, etc.). In yet other examples, the application can perform a combination of the above to determine the context of the data. For instance, the header of a column can be first used to narrow the potential entity tags, followed by an evaluation of the metadata collected and entries in the column Here, the application has analyzed table 410 and based on the entity tag database and table 410, has suggested that column 413 belongs to a category. As a result, the application can present icon 450 to indicate that the suggested category is available for column 413. The analysis can include matching a subset of the entries in column 413 with entity tags that belong to an entity collection. The matching can include text matching the plain text of an entry in column 413 with the text field of an entity tag. If the names are the same, a match is found. In other examples, other icons or indicators can be used to signify a result related to the context of the dataset.

FIG. 4b illustrates a screenshot of an application enriching data according to one embodiment. Screenshot 400 can be presented when icon 450 is selected from FIG. 4a. As shown, selection of the icon can cause the application to present window 460. Window 460 is configured to confirm whether the suggested context is accurate. Window 460 includes the text "Data in this column identified as City. Do you wish to add geocode data?" along with a "Yes" and "No" icon to the user to confirm or deny the suggested context. If the "Yes" icon is selected, the application can set an entity tag to the column or to each entry in the column. The entity tag can be used to indicate that the column or entry is a geocode. This can allow the application to search available resources and link additional information related to the city to an entry, thus enriching the data stored in table 410. The additional information can come from web server 120, open access database 130, or database 112, to name a few.

In some embodiments, setting an entity tag on a column or entry can cause the application to supply data to be added into additional columns of table 410. For example, the application can add in additional columns for storing longitude and latitude values and populate the additional columns based on the tagged entity or column.

Figure 5:
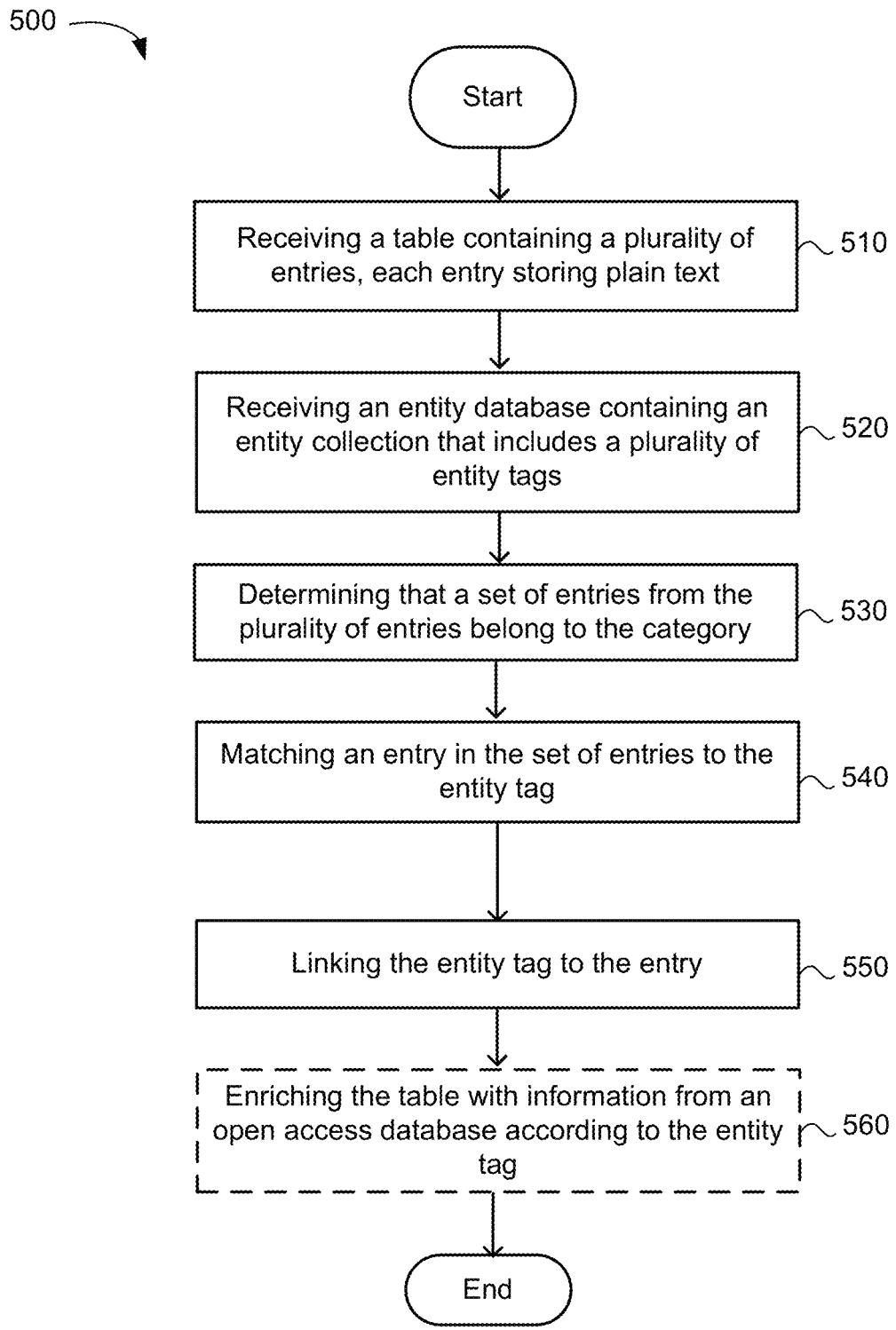
FIG. 5 illustrates a process to enrich a table according to one embodiment.

FIG. 5 illustrates a process to enrich a table according to one embodiment. Process 500 can be stored in computer readable code and executed by a computer. Process 500 begins by receiving a table containing a plurality of entries, each entry storing plain text at 510. In one example, the table can be received by detecting an input representative of selecting an area of a web page, determining that the area of the web page encompasses or substantially encompasses a table, and scraping the table from the web page. Process 500 can then continue by receiving an entity database containing an entity collection, the entity collecting including a plurality of entity tags that belong to a category, wherein an entity tag from the plurality of entity tags is linked with information from an open access database at 520. In other examples, the entity database can be stored locally and does not need to be received.

Once the table has been received, process 500 can continue by determining that a set of entries from the plurality of entries belong to the category at 530. In one example, this is performed by matching a subset of the set of entries with one of the plurality of entity tags. Thus, some of the entries from the set of entries are sampled to determine whether the set of entries belong to the category. This can include matching the plain text in an entry with the plain text stored within an entity tag. Only some of the entries may be checked to save processing time. Process 500 then continues by matching an entry in the set of entries to an entity tag of the entity collection at 540. Once a match is found, process 500 continues by linking the entity tag to the entry at 550. Linking can include setting metadata of the entry to a pointer of the entity tag. In other examples, the entity tag can replace the plain text in the entry. Optionally, process 500 can continue by enriching the table with information from the open access database according to the entity tag at 560. This can include associating (or linking) an article from the open access database to the entry based on the entity tag. In another example, this can include generating new columns or rows in the table to import information from the open access database.

Figure 6:
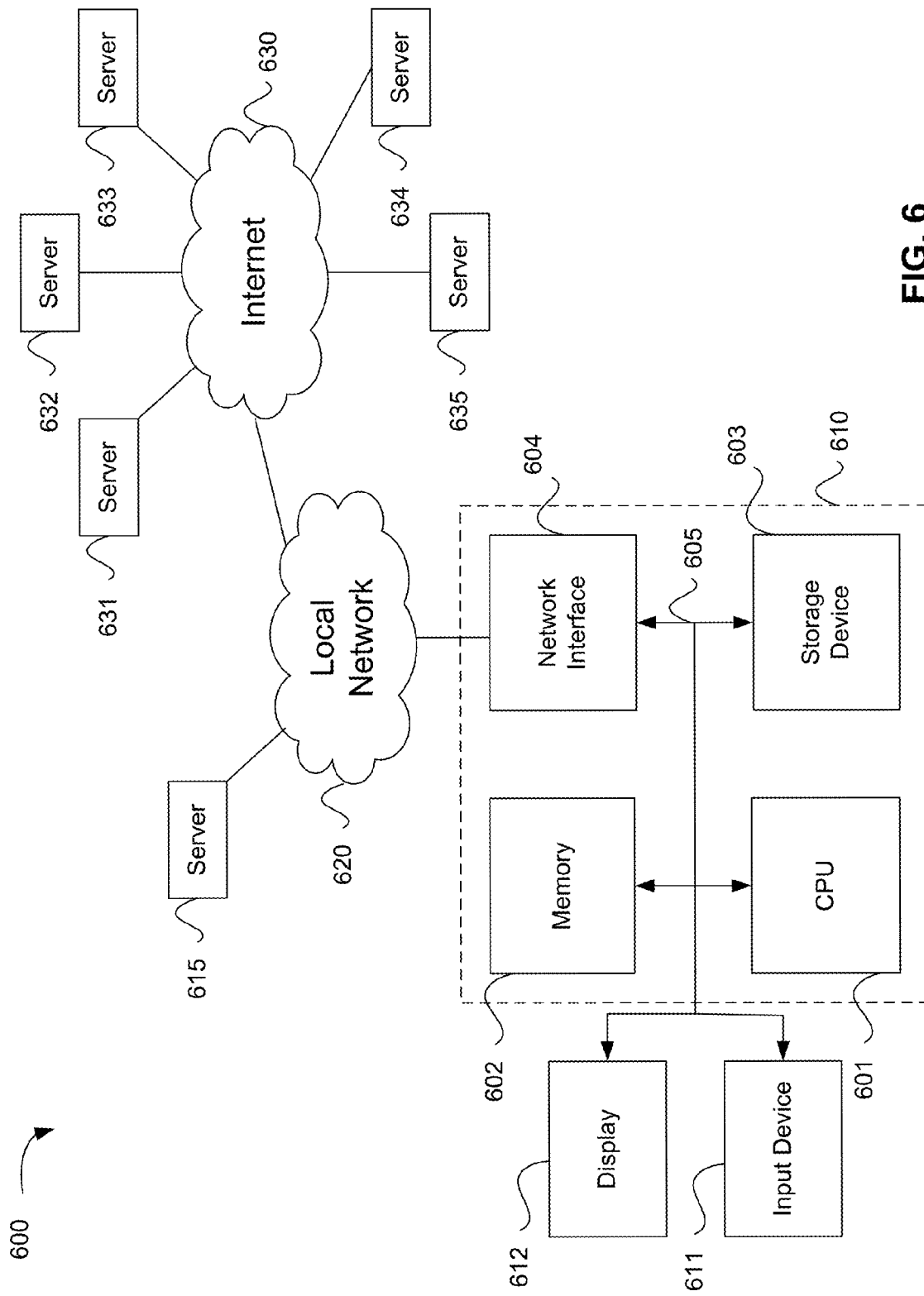
FIG. 6 illustrates an exemplary computer system according to one embodiment.

An exemplary computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
receiving, by a processor, a table containing a plurality of entries, each entry storing plain text;
receiving, by the processor, an entity database containing an entity collection, the entity collection including a plurality of entity tags that belong to a category, wherein an entity tag from the plurality of entity tags is linked with metadata information from an open access database;
determining, by the processor, that a set of entries from the plurality of entries belong to the category;
matching, by the processor, an entry in the set of entries to the entity tag;
linking, by the processor, the entity tag to the entry;
searching, by the processor, an available resource other than the open access database to link additional data related to the entry according to the entity tag;
selecting the additional data from a canvas overlying the available resource; and
enriching, by the processor, the table to include the additional data in a new column.

2. The computer-implemented method of claim 1, further comprising:
enriching, by the processor, the table with the information from the open access database according to the entity tag.

3. The computer-implemented method of claim 2, wherein enriching comprises importing information from the open access database to the table based on the entity tag.

4. The computer-implemented method of claim 1, wherein the entity tag is configured to provide context to the plain text of the entry.

5. The computer-implemented method of claim 1, wherein determining that the set of entries belong to the category comprises matching, by the processor, a subset of the set of entries with one of the plurality of entity tags.

6. The computer-implemented method of claim 5, wherein the plurality of entity tags include a text field and matching the subset of the set of entries comprises comparing, by the processor, the plain text for each of the subset of entries with the text field of the plurality of entities.

7. The computer-implemented method of claim 1, wherein receiving the table comprises:
detecting, by the processor, an input representative of selecting an area of a web page;
determining, by the processor, that the area of the web page substantially contains the table; and
scraping, by the processor, the table from the web page.

8. A non-transitory computer readable storage medium storing one or more programs, the one or more programs comprising instructions for:
- receiving a table containing a plurality of entries, each entry storing plain text;
- receiving an entity database containing an entity collection, the entity collection including a plurality of entity tags that belong to a category, wherein an entity tag from the plurality of entity tags is linked with metadata information from an open access database;
- determining that a set of entries from the plurality of entries belong to the category;
- matching an entry in the set of entries to the entity tag;
- linking the entity tag to the entry;
- searching an available resource other than the open access database to link additional data related to the entry according to the entity tag;
- selecting the additional data from a canvas overlying the available resource; and
- enriching the table to include the additional data in a new column.

9. The non-transitory computer readable storage medium of claim 8, further comprising:
- enriching the table with the information from the open access database according to the entity tag.

10. The non-transitory computer readable storage medium of claim 9, wherein enriching comprises importing information from the open access database to the table based on the entity tag.

11. The non-transitory computer readable storage medium of claim 8, wherein the entity tag is configured to provide context to the plain text of the entry.

12. The non-transitory computer readable storage medium of claim 8, wherein determining that the set of entries belong to the category comprises matching a subset of the set of entries with one of the plurality of entity tags.

13. The non-transitory computer readable storage medium of claim 12, wherein the plurality of entity tags include a text field and matching the subset of the set of entries comprises comparing the plain text for each of the subset of entries with the text field of the plurality of entities.

14. The non-transitory computer readable storage medium of claim 8, wherein receiving the table comprises:
- detecting an input representative of selecting an area of a web page;
- determining that the area of the web page substantially contains the table; and
- scraping the table from the web page.

15. A computer implemented system, comprising:
- one or more computer processors; and
- a non-transitory computer-readable storage medium comprising instructions, that when executed, control the one or more computer processors to be configured for:
  - receiving a table containing a plurality of entries, each entry storing plain text;
  - receiving an entity database containing an entity collection, the entity collection including a plurality of entity tags that belong to a category, wherein an entity tag from the plurality of entity tags is linked with metadata information from an open access database;
  - determining that a set of entries from the plurality of entries belong to the category;
  - matching an entry in the set of entries to the entity tag;
  - linking the entity tag to the entry;
  - searching, by the processor, an available resource other than the open access database to link additional data related to the entry according to the entity tag;
  - selecting the additional data from a canvas overlying the available resource; and
  - enriching, by the processor, the table to include the additional data in a new column.

16. The computer implemented system of claim 15, further comprising:
- enriching the table with the information from the open access database according to the entity tag.

17. The computer implemented system of claim 16, wherein enriching comprises importing information from the open access database to the table based on the entity tag.

18. The computer implemented system of claim 15, wherein determining that the set of entries belong to the category comprises matching a subset of the set of entries with one of the plurality of entity tags.

19. The computer implemented system of claim 18, wherein the plurality of entity tags include a text field and matching the subset of the set of entries comprises comparing the plain text for each of the subset of entries with the text field of the plurality of entities.

20. The computer implemented system of claim 15, wherein receiving the table comprises:
- detecting an input representative of selecting an area of a web page;
- determining that the area of the web page substantially contains the table; and
- scraping the table from the web page.

* * * * *